United States Patent Office 3,057,886
Patented Oct. 9, 1962

3,057,886
PROCESS FOR HYDROXYCHLORINATING $\Delta^{9(11)}$-STEROIDS
Josef Fried, Princeton, N.J., and Josef E. Herz, Mexico City, Mexico, assignors to Olin Mathieson Chemical Corporation, New York, N.Y., a corporation of Virginia
No Drawing. Filed Dec. 10, 1958, Ser. No. 779,302
5 Claims. (Cl. 260—397.45)

This application-in-part of our parent application, Serial No. 429,108, filed May 11, 1954, now abandoned.

This invention relates to a new process for synthesizing valuable steroids.

An object of this invention is the provision of an advantageous process of introducing a 9α-chloro and 11β-hydroxy radical into a $\Delta^{9(11)}$-steroid.

The process of this invention essentially comprises reacting a $\Delta^{9(11)}$-steroid with hypochlorous acid and recovering the product produced.

Steroids useful as starting materials in the practice of the process of this invention include the members of the $\Delta^{9(11)}$-androstene (including the $\Delta^{9(11)}$-etiocholene) and the $\Delta^{9(11)}$-pregnene (including the $\Delta^{9(11)}$-allopregnene) series; the preferred compounds belonging to the $\Delta^{9(11)}$-pregnene series, which includes the $\Delta^{4,9(11)}$-pregnadiene and $\Delta^{1,4,9(11)}$-pregnatriene compounds. The specifically preferred compounds of the $\Delta^{9(11)}$-pregnene series are those of the general formula:

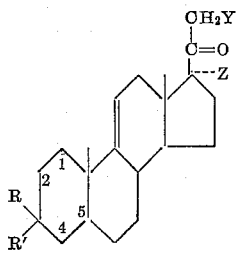

the 1,2- and 4,5-positions being double-bonded or saturated, wherein R is —H, R' is —OH, or together R and R' is =O or a group convertible thereto by hydrolysis (such as a ketal group); Y is —H, halogen, —OH, or —OR'''; and Z is either —H or (α)—OH; R''' is an organic radical such as an acyl radical (acetyl, benzoyl, naphthoyl, etc.), an aliphatic radical (methyl, ethyl, etc.) or an aralkyl radical (benzyl, phenethyl, etc.).

The resulting compounds have the general formula:

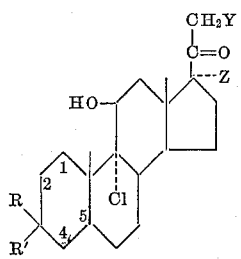

wherein the 1,2- and 4,5-positions are double-bonded or saturated as before, and R, R', Y, and Z are as hereinbefore identified.

The steroids formed by the process of this invention are highly active gluco- and minerolo-corticoids, as disclosed in U.S. Patent No. 2,852,511, granted September 16, 1958.

Suitable chlorinating agents for the conversion of $\Delta^{9(11)}$-steroids to the corresponding 9α-chloro-11β-hydroxy (or 11β-organo-oxy) derivatives, are, for example, aqueous hypochlorous acid, N-chloroamides or N-chloro-imides or carboxylic acids (including derivatives thereof), and include, inter alia, N-chloroacetamide.

The hypochlorous acid used for the conversion of the $\Delta^{9(11)}$-steroids to the corresponding 9α-chloro-11β-hydroxy derivatives, may be employed as such or may be formed in situ by interacting an N-chloro-amide or N-chloro-imide of a carboxylic acid (including derivatives thereof) with water. Suitable N-chloro-amides and N-chloro-imides include N-chloroacetamide (or N-chloro-amides of other fatty acids), N-chlorosuccinimide (or other cyclic imides of amino fatty acids), and N,N-dichlorodimethylhydantoin. As previously stated, if such an N-chloro-amide or N-chloro-imide is employed, water must be present in the reaction medium. The reaction medium preferably also includes an inert solvent for the steroid reactant. Representative of such solvents are the tertiary alcohols (such as tertiary butanol), ethers (such as acyclic ethers, e.g. diethyl ether and methyl isopropyl ether or cyclic ethers, e.g. dioxane), and certain ketones.

Unless hypochlorous acid is used directly as the chlorinating agent, the reaction is preferably effected in the presence of a relatively strong acid. Although any strong acid may be used, and acids such as sulfuric acid and nitric acid are operative, it is preferred to conduct the reaction in the presence of a strong acid whose anion possesses low nucleophilicity. By operating in this way, losses due to the formation of undesired 11β-esters are eliminated, and the final yield of the desired product is increased. Suitable relatively strong acids include perchloric acid, p-toluene sulfonic among others. It is noted that the use of a relatively strong acid, such as perchloric acid, is advantageous in the preparation of chlorinated 11β-hydroxy steroids generally (e.g. from $\Delta^{11(12)}$-steroids also), since it gives higher yields of the chloro 11β-hydroxy steroids because no by-product esters are formed.

In many instances when a $\Delta^{9(11)}$-steroid is treated in accordance with the process of this invention, a 9α,11β-dichloro derivative is formed as a by-product, and this can be reduced by means of chromous chloride (or other reducing agent capable of reducing compounds possessing (vicinal chlorine atoms, e.g. zinc and acetic acid, and Raney nickel) to regenerate the $\Delta^{9(11)}$-steroid, and this latter can then be separated from the desired 9α-chloro-11β-oxygenated steroid. This reduction may be carried out in situ or in a separate operation.

If the reaction is conducted in an aqueous medium, an 11β-hydroxy steroid is produced. To obtain an 11β-organo-oxy derivative, an anhydrous alcoholic or acid solution is used. If methanol is substituted for water, an 11β-methoxy compound is produced. If acetic acid is substituted for water, an 11β-acetoxy compound is formed.

The following examples are illustrative of the invention:

EXAMPLE 1

*9α-Chlorohydrocortisone Acetate (9α-Chloro-$\Delta^4$-Pregnene 11β,17α,21-Triol-3,20-Dione 21-Acetate) From $\Delta^{4,9(11)}$ Pregnadiene-17α,21-Diol-3,20-Dione 21-Acetate*

246 mg. of finely pulverized $\Delta^{4,9(11)}$-pregnadiene 17α,21-diol-3,20-dione 21-acetate is dissolved in 50 ml. of hot dioxane and after adding 5 ml. of water, the solution is rapidly cooled to room temperature while agitating. To the resulting suspension is added 268 mg. of N,N-dichlorodimethyl-hydantoin and 5 ml. of 1 N perchloric acid, and the reaction is allowed to proceed at room temperature for two and one-half hours. Excess N,N-dichlorodimethylhydantoin is then destroyed by the addition of dilute aqueous sodium sulfite. 50 ml. of chloroform is added, and the small aqueous phase floating on top is separated off. The chloroform-dioxane phase is washed with dilute sodium bicarbonate and with water and dried over sodium sulfate. Removal of the solvents in vacuo leaves a readily crystallizing residue (about 330 mg.). A small portion of the residue is recrystallized for analysis from acetone, M.P. about 241° C. (dec.).

Analysis.—Calcd. for $C_{23}H_{28}O_5Cl_2$ (455.36): C, 60.66; H, 6.19; Cl, 15.57. Found (approximately): C, 60.88; H, 6.60; Cl, 15.41.

The above compound represents 9α,11β-dichloro-Δ⁴-pregnene-17α,21-diol-3,20-dione 21 acetate. The total mixture obtained above is dissolved in 5 ml. dioxane and treated at room temperature with 2 ml. of an aqueous solution of chromous chloride [prepared as described in the J. Am. Chem. Soc., 72, 4080 (1950)]. After 30 minutes the reaction mixture is aerated to oxidize the remaining chromous chloride to chromic chloride and 20 ml. of chloroform is added. After separation of the layers, the chloroform-dioxane extract is washed with water, dilute sodium bicarbonate, and again with water and finally dried over sodium sulfate. Removal of the solvents in vacuo leaves a residue (about 286 mg.) which crystallizes spontaneously. Since this product is a mixture, it is chromatographed on 6 g. of silica gel. Elution with chloroform yields $\Delta^{4,9(11)}$-pregnadiene-17α,21-diol-3,20-dione 21-acetate (about 110 mg.) which after recrystallization from acetone melts at about 234–236° C. A mixture melting point with an authentic sample of that substance shows no depression. Subsequent elution of the column with 5% acetone in chloroform affords 9α-chloro-hydrocortisone acetate (about 100 mg.) which after crystallization, first from acetone-hexane and finally from acetone, melts at about 202° C. (dec.). Infrared comparison with an authentic sample of 9α-chlorohydrocortisone acetate shows the two to be identical.

EXAMPLE 2

*Reaction of $\Delta^{4,9(11)}$-Pregnadiene-17α,21-Diol-3,20-Dione 21-Acetate With Hypochlorous Acid*

To a suspension of 400 mg. of $\Delta^{4,9(11)}$-pregnadiene-17α,21-diol-3,20-dione 21-acetate in 40 ml. of dioxane and 4 ml. of water is added at room temperature 2.5 ml. of an 0.61 N aqueous solution of hypochlorous acid (prepared by saturating a 10% solution of sodium bicarbonate with chlorine at 0° and adjusting the pH of the resulting solution with sodium hydroxide to 6.7). The suspension clears within 2 minutes, and 20 minutes later excess hypochlorous acid is destroyed by the addition of sodium sulfite solution. 150 ml. of chloroform is added, the phases are separated and the chloroform solution washed with water. After drying over sodium sulfate the solvent is removed in vacuo. The crystalline residue after several recrystallizations from acetone has the following properties: M.P. about 243–244° (dec.); $[\alpha]_D^{23}$ +164° (c. 107 in $CHCl_3$);

$$\lambda_{max.}^{alc.} \; 238 \; m\mu \; (\epsilon = 15{,}600)$$

Analysis.—Calcd. for $C_{23}H_{30}O_5Cl_2$: C, 60.3; H, 6.62; Cl, 15.55. Found: C, 60.36; H, 6.68; Cl, 13.38.

To obtain 9α-chlorohydrocortisone acetate, the total reaction product is treated with chromous chloride and the resulting mixture of $\Delta^{4,9(11)}$-pregnadiene-17α,21-diol-3,20-dione 21-acetate and 9α-chlorohydrocortisone acetate separated by chromatography as described in Example 1.

EXAMPLE 3

*9α-Chloro-11β,17α-Dihydroxyprogesterone From $\Delta^{4,9(11)}$-Pregnadiene-17α-ol-3,20-Dione*

110 mg. of $\Delta^{4,9(11)}$-pregnadiene-17α-ol-3,20-dione is dissolved in 20 ml. of dioxane and 2 ml. of water is added. To the resulting solution is added 100 mg. of N,N-dichlorodimethylhydantoin and the mixture is allowed to stand at room temperature for 30 minutes. Dilute aqueous sodium sulfite solution is added to destroy residual N,N-dichloro-dimethyl hydantoin and the mixture is dilute with 25 ml. of chloroform which causes separation into two layers. The chloroform-dioxane phase is separated off, washed with water, sodium bicarbonate and again with water, dried over sodium sulfate and evaporated to dryness in vacuo. The resulting residue (about 128 mg.), on recrystallization from acetone-chloroform-hexane yields pure 9α-chloro-11β-17α-dihydroxyprogesterone, M.P. about 246–248° C. (dec). The compound is identified by infrared spectrum and mixture melting point comparison with an authentic sample. Yield about 58 mg.

EXAMPLE 4

*9α-Chloro-11β-Hydroxyprogesterone From $\Delta^{4,9(11)}$-Pregnadiene-3,20-Dione*

A solution of 103 mg. of $\Delta^{4,9(11)}$-pregnadiene-3,20-dione in 20 ml. of dioxane and 2 ml. of water is treated with 100 mg. of N,N-dichlorodimethylhydantoin and 1 ml. of 1 N perchloric acid as described above. The resulting crystalline residue (about 140 mg.) is dissolved in 4 ml. of acetone and treated with 1 ml. of a chromous chloride solution as described in Example 1. The work-up yielded about 104 mg. of amorphous material which is dissolved in 0.5 ml. of chloroform and 4 ml. of benzene and chromatographed on 2 g. of silica gel. Elution of the column with chloroform benzene 1:8 (230 ml.) affords about 35 mg. of $\Delta^{4,9(11)}$-pregnadiene-3,20-dione. Subsequent elution of the column with benzene chloroform 1:1 (300 ml.) furnishes about 43 mg. of crude 9α-chloro-11β-hydroxyprogesterone, which after crystallization from acetone-hexane has the following properties: M.P. approximately 205° C. (dec.); $[\alpha]_D^{23}$ +199° (c., 0.59 in chloroform). There is no depression in melting point when this material is mixed with an authentic sample of 9α-chloro-11β-hydroxyprogesterone.

The above two reactions could be combined into a single work-up by adding the chromous chloride solution directly to the initial reaction mixture after the destruction of excess N,N-dichlorodimethylhydantoin with sodium sulfite, as described in the following example:

EXAMPLE 5

*9α-Chloro-11β-Hydroxyprogesterone From $\Delta^{4,9(11)}$-Pregnadiene-3,20-Dione*

A solution of 103 mg. of $\Delta^{4,9(11)}$-pregnadiene-3,20-dione in 20 ml. of dioxane and 2 ml. of water is treated with 100 mg. of N,N-dichlorodimethylhydantoin and 1 ml. of 1 N perchloric acid as in Example 4. Excess N,N-dichlorodimethylhydantoin is then destroyed by the addition of dilute aqueous sodium sulfite. The mixture is diluted with 30 ml. of chloroform which causes separation into two layers. The chloroform-dioxane phase is separated off, washed with water, sodium bicarbonate, and again with water; it is freed from chloroform by vacuum concentration and treated with 2 ml. of a chromous chloride solution as described in Example 1. The work-up yields about 45 mg. of 9α-chloro-11β-hydroxyprogesterone.

EXAMPLE 6

*9α-Chlorocorticosterone Actate From $\Delta^{4,9(11)}$-Pregnadiene-21-Ol-3,20-Dione 21-Acetate*

Following the process of Example 1, but substituting $\Delta^{4,9(11)}$-pregnadiene-21-ol-3,20-dione 21-acetate for $\Delta^{4,9(11)}$-pregnadiene-17α,21-diol-3,20-dione 21-acetate, the corresponding 9α-chlorocorticosterone acetate is produced.

EXAMPLE 7

Following the process of Example 1, but substituting $\Delta^{4,9(11)}$-pregnadiene17α,21-diol-3,20-dione for the corresponding 21-acetate, the compound 9α-chloro-Δ⁴-pregnene-11β,17α,21-triol-3,20-dione (9α-chlorohydrocortisone) is produced.

EXAMPLE 8

*9α-Chloroprednisolone Acetate From $\Delta^{1,4,9(11)}$-Pregnatriene-17α,21-Diol-3,20-Dione 21-Acetate*

Following the procedure of Example 1, but substituting 240 mg. of $\Delta^{1,4,9(11)}$-pregnatriene-17α,21-diol-3,20-dione 21-acetate for the diene in the example, there is obtained 9α-chloroprednisolone acetate.

The invention may be variously otherwise embodied within the scope of the appended claims.

What is claimed is:

1. The process for converting a $\Delta^{9(11)}$-steroid to a corresponding 9α-chloro-11β-hydroxy steroid which comprises reacting said steroid with N,N-dichlorodimethylhydantoin in the presence of water and a strong acid whose anion possesses low nucleophilicity, and recovering said 9α-chloro-11β-hydroxy steroid.

2. The process for converting $\Delta^{4,9(11)}$-pregnadiene-17α-ol-3,20-dione to 9α-chloro-11β,17α-dihydroxyprogesterone which comprises reacting said pregnadiene with N,N-dichlorodimethylhydantoin in the presence of water and a strong acid whose anion possesses low nucleophilicity and recovering 9α-chloro-11β,17α-dihydroxyprogesterone.

3. The process for converting $\Delta^{4,9(11)}$-pregnadiene-3,20-dione to 9α-chloro-11β-hydroxyprogesterone which comprises reacting said pregnadiene with N,N-dichlorodimethylhydantoin in the presence of water and a strong acid whose anion possesses low nucleophilicity, dechlorinating a polychlorinated by-product formed thereby, and recovering 9α-chloro-11β-hydroxyprogesterone.

4. The process for converting a $\Delta^{9(11)}$-pregnene of the general formula:

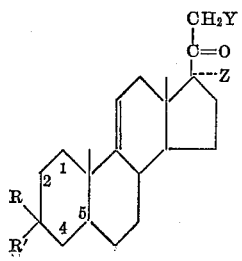

wherein the carbon atoms in the 1,2 and 4,5 positions are joined by bonds selected from the group consisting of single and double bonds, R is hydrogen, R' is hydroxyl, and when taken together R and R' is selected from the ground consisting of oxo and a group convertible thereto by hydrolysis; Y is selected from the group consisting of hydrogen, hydroxy, halogen and the acyloxy radical of a hydrocarbon carboxylic acid of less than ten carbon atoms; and Z is selected from the group consisting of hydrogen and α-hydroxy, to the corresponding 9α-chloro-11β-hydroxy derivatives, which comprises reacting said unsaturated pregnene in the presence of water with N,N-dichlorodimethylhydantoin in the presence of a strong acid whose anion possesses low nucleophilicity, and recovering the 9α-chloro-11β-hydroxy derivative.

5. The process for converting a 21-ester of $\Delta^{4,9(11)}$-pregnadiene-17α,21-diol-3,20-dione and a hydrocarbon carboxylic acid of less than ten carbon atoms to the corresponding 21-ester of 9α-chlorohydrocortisone, which comprises reacting said pregnadiene in the presence of perchloric acid with N,N-dichlorodimethylhydantoin in the presence of water, dechlorinating a polychlorinated by-product formed thereby by treatment with chromous chloride, and recovering the 9α-chlorohydrocortisone produced.

References Cited in the file of this patent

UNITED STATES PATENTS

| | | |
|---|---|---|
| 2,707,190 | Farrar | Apr. 26, 1955 |
| 2,751,402 | Schneider | June 19, 1956 |
| 2,838,501 | Campbell et al. | June 10, 1958 |
| 2,852,511 | Fried | Sept. 16, 1958 |

OTHER REFERENCES

Rosenkranz et al.: J. Am. Chem. Soc., vol. 72 (1950), page 4080.

Fried et al.: J. Am. Chem. Soc., volume 75 (May 5, 1953), pages 2273 and 2274.

UNITED STATES PATENT OFFICE
CERTIFICATE OF CORRECTION

Patent No. 3,057,886　　　　　　　　　　October 9, 1962

Josef Fried et al.

It is hereby certified that error appears in the above numbered patent requiring correction and that the said Letters Patent should read as corrected below.

Column 1, line 11, for "application-in-part" read -- application is a continuation-in-part --; column 4, line 61, for "Actate", in italics, read -- Acetate --, in italics.

Signed and sealed this 22nd day of October 1963.

(SEAL)
Attest:

ERNEST W. SWIDER
Attesting Officer

EDWIN L. REYNOLDS

Acting Commissioner of Patents